US012809782B2

(12) United States Patent
Hong et al.

(10) Patent No.: US 12,809,782 B2
(45) Date of Patent: Nov. 24, 2026

(54) DEVICE AND METHOD FOR PERFORMING ADDRESS TRANSLATION USING HASHED PAGE TABLE

(71) Applicants: SAMSUNG ELECTRONICS CO., LTD., Suwon-si (KR); RESEARCH & BUSINESS FOUNDATION SUNGKYUNKWAN UNIVERSITY, Suwon-si (KR)

(72) Inventors: Seokin Hong, Suwon-si (KR); Sungbin Jang, Suwon-si (KR); Junhyeok Park, Suwon-si (KR); Osang Kwon, Suwon-si (KR); Yongho Lee, Suwon-si (KR)

(73) Assignees: SAMSUNG ELECTRONICS CO., LTD., Suwon-si (KR); RESEARCH & BUSINESS FOUNDATION SUNGKYUNKWAN UNIVERSITY, Suwon-si (KR)

( * ) Notice: Subject to any disclaimer, the term of this patent is extended or adjusted under 35 U.S.C. 154(b) by 0 days.

(21) Appl. No.: 19/050,757

(22) Filed: Feb. 11, 2025

(65) Prior Publication Data

US 2026/0105007 A1 Apr. 16, 2026

(30) Foreign Application Priority Data

Oct. 10, 2024 (KR) ........................ 10-2024-0137831
Nov. 15, 2024 (KR) ........................ 10-2024-0163150

(51) Int. Cl.
*G06F 12/10* (2016.01)
*G06F 12/02* (2006.01)
*G06F 12/1009* (2016.01)

(52) U.S. Cl.
CPC ...... *G06F 12/1009* (2013.01); *G06F 12/0223* (2013.01)

(58) Field of Classification Search
CPC ............. G06F 12/1009; G06F 12/0223; G06F 12/109; G06F 12/1018; G06F 2212/651; G06F 2212/657
(Continued)

(56) References Cited

U.S. PATENT DOCUMENTS 8,806,146 B2 8/2014 Ito et al.
10,083,124 B1 9/2018 Brandt et al.
(Continued)

OTHER PUBLICATIONS

Idan Yaniv et al., "Hash, don't cache (the page table)," SIGMETRICS '16, Jun. 14-18, 2016, Antibes Juan-Les-Pins, France, DOI: http://dx.doi.org/10.1145/2896377.2901456, pp. 337-350 (14 pages total).
(Continued)

*Primary Examiner* — Than Nguyen
(74) *Attorney, Agent, or Firm* — Sughrue Mion, PLLC

(57) ABSTRACT

Am electronic device includes: a processing unit; a device memory; and a memory management unit configured to: receive, from the processing unit, a memory access request corresponding to a virtual address, acquire a hash value of a virtual page number (VPN) tag associated with the virtual address by applying a hash function to the VPN tag, determine a step size for avoiding a hash collision, based on the VPN tag, and select a hash table entry (HTE) allocated to the VPN tag from among a plurality of candidate HTEs included in a hashed page table, based on the hash value and the step size.

10 Claims, 8 Drawing Sheets

(58) Field of Classification Search
USPC .......................................................... 711/206
See application file for complete search history.

(56) References Cited

U.S. PATENT DOCUMENTS

| | | | | |
|---|---|---|---|---|
| 10,366,011 | B1 * | 7/2019 | Schneider | G06F 12/1018 |
| 10,884,948 | B2 | 1/2021 | Breslow | |
| 11,636,043 | B2 | 4/2023 | Wait et al. | |
| 11,636,045 | B2 | 4/2023 | Karve et al. | |
| 11,687,466 | B1 * | 6/2023 | Favor | G06F 12/1054 711/207 |
| 11,893,653 | B2 | 2/2024 | Rao et al. | |
| 2017/0262387 | A1 * | 9/2017 | Sell | G06F 12/0864 |
| 2017/0270051 | A1 * | 9/2017 | Chen | G06F 12/10 |
| 2019/0294557 | A1 * | 9/2019 | Dhuse | G06F 3/0604 |
| 2023/0185726 | A1 | 6/2023 | Shirahige | |
| 2024/0403209 | A1 * | 12/2024 | Bo | G06F 12/0246 |

OTHER PUBLICATIONS

Dimitrios Skarlatos et al., “Elastic cuckoo page tables: Rethinking virtual memory translation for parallelism,” ASPLOS ’20, Mar. 16-20, 2020, Lausanne, Switzerland, https://doi.org/10.1145/3373376.3378493, pp. 1093-1108 (16 pages total).
“Pascal MMU Format Changes”, Nvidia, Mar. 5, 2016 (5 pages total).

* cited by examiner

DEVICE AND METHOD FOR PERFORMING ADDRESS TRANSLATION USING HASHED PAGE TABLE

CROSS-REFERENCE TO RELATED APPLICATIONS

This application is based on and claims priority under 35 U.S.C. § 119 to Korean Patent Application No. 10-2024-0137831 filed on Oct. 10, 2024, and Korean Patent Application No. 10-2024-0163150 filed on Nov. 15, 2024, in the Korean Intellectual Property Office, the disclosures of which are incorporated by reference herein in their entireties.

BACKGROUND

1. Field

The disclosure relates to address translation using a hashed page table.

2. Description of Related Art

Efficiently mapping virtual addresses and physical addresses is an important part of memory management in a computer system. An operating system (OS) may use a virtual memory system to enable memory access using a virtual address without a program having to manage a memory space directly. The virtual memory system may allow each process to have an independent virtual memory space, preventing memory collisions, providing memory protection, and ensuring efficient memory resource utilization.

The virtual memory system may require a virtual address to be translated into a physical address, for which a page table may be used. A page table may refer to a data structure representing the location of a physical page to which each virtual page is mapped. The page table may be managed using a tree structure or a multi-level structure.

The above description is information the inventor(s) acquired during the course of conceiving the present disclosure, or already possessed at the time, and is not necessarily art publicly known before the present application was filed.

SUMMARY

One or more example embodiments may address at least some of the problems and/or disadvantages described above and/or other disadvantages not described above. In addition, the example embodiments may not be required to overcome the disadvantages described above, and an example embodiment may not overcome any of the problems described above.

In accordance with an aspect of the disclosure, an electronic device, includes: a processing unit; a device memory; and a memory management unit configured to: receive, from the processing unit, a memory access request corresponding to a virtual address, acquire a hash value of a virtual page number (VPN) tag associated with the virtual address by applying a hash function to the VPN tag, determine a step size for avoiding a hash collision, based on the VPN tag, and select a hash table entry (HTE) allocated to the VPN tag from among a plurality of candidate HTEs included in a hashed page table, based on the hash value and the step size.

The electronic device may further include: a page table base register configured to store a physical base address of a memory block in the device memory, wherein the hashed page table is stored in the memory block, and the memory management unit may be further configured to: acquire a physical address by applying the hash value of the VPN tag and the step size to the physical base address of the memory block, and select an HTE corresponding to the physical address as the HTE allocated to the VPN tag.

The memory management unit may be further configured to:

select a page table entry (PTE) from among a plurality of candidate PTEs included in the selected HTE, based on a PTE offset corresponding to the virtual address, and acquire a physical base address of a page corresponding to the virtual address stored in the selected PTE.

The memory management unit may be further configured to: apply a page offset of the virtual address to the acquired physical base address of the page to obtain a result address, and determine the result address as a physical address corresponding to the virtual address.

The device memory may be configured to store a step table including step sizes for a plurality of candidate pages, and the memory management unit may be further configured to: determine, based on a step table tag associated with the VPN tag, a step table entry (STE) allocated to the step table tag from among a plurality of candidate STEs included in the step table, and determine, based on a step offset of the VPN tag, a step size allocated to the VPN tag from among a plurality of candidate step sizes included in the STE.

The electronic device may further include: a step table base register configured to store a physical base address of a memory block in the device memory, wherein the step table is stored in the memory block, and the memory management unit may be further configured to: acquire a hash value of the step table tag by applying a step hash function to the step table tag, obtain a value by applying the hash value of the step table tag to the physical base address stored in the step table base register, and acquire a physical base address of the STE based on the value.

The memory management unit may further include: a step cache configured to store cached STEs among the plurality of candidate STEs, and the memory management unit may be further configured to: select a cached STE from among a plurality of cached STEs, based on a step cache index of the step table tag, and based on a tag associated with the selected cached STE being the same as a step cache tag associated with the step table tag, determine the selected cached STE as the STE.

The memory management unit may be further configured to: determine the STE without access to the step table included in the device memory, based on the tag of the selected cached STE being same as the step cache tag.

The memory management unit may be further configured to: prevent the selected cached STE from being determined as the STE, based on the tag of the selected cached STE being different from the step cache tag, acquire, from the device memory, the STE from among the plurality of candidate STEs included in the step table, and replace the selected cached STE stored in the step cache with the acquired STE.

The memory management unit may be further configured to: based on acquiring the hash value, select a temporary HTE corresponding to the hash value from among the plurality of candidate HTEs in the hashed page table, based on a tag of the temporary HTE being same as the VPN tag, determine the step size as a default value and select the temporary HTE as the HTE allocated to the VPN tag, and based on the tag of the temporary HTE being different from the VPN tag, access at least one from among a step cache and the device memory to determine the step size.

In accordance with an aspect of the disclosure, an electronic device includes: a device memory; and a memory management unit configured to: based on receiving an allocation request from a host device of the electronic device, allocate, to a hashed page table, a memory block in the device memory, wherein the memory block has a memory size determined based on a size of the device memory, and based on receiving a hashed page table store request from the host device, ?a physical address of the device memory based on a mapping result between a virtual address of a page and the physical address, and processing unit configured to: based on receiving an execution request for an application from the host device, execute the application using the hashed page table, wherein the memory management unit may be further configured to maintain a state in which the memory block is allocated to the hashed page table while the processing unit executes the application.

The memory management unit may be further configured to not additionally allocate another memory block different from the memory block in the device memory to the hashed page table.

The hashed page table store request received from the host device may include a request for storing the page in a memory region of the physical address and storing the physical address in a page table entry (PTE), the PTE may be selected from among a plurality of candidate PTEs included in a hash table entry (HTE), based on a PTE offset corresponding to the virtual address of the page, and the HTE may be selected from among a plurality of candidate HTEs included in the hashed page table, based on a hash value of a virtual page number (VPN) tag associated with the virtual address of the page.

The allocation request may include a hashed page table allocation request, the memory block may include a first memory block, and the memory management unit may be further configured to: based on receiving a step page allocation request from the host device, allocate a second memory block included in the device memory to a step table, and based on receiving a step size store request from the host device, store, in the second memory block, a step size for avoiding a hash collision between the hash value of the VPN tag and a hash value of another VPN tag as at least a portion of the step table.

The electronic device may further include: a step table base register configured to store a physical base address of the second memory block.

The step size store request may include a request for storing the step size in a step size region, the step size region may be selected from among a plurality of candidate step size regions included in a step table entry (STE), based on a step offset corresponding to the VPN tag, and the STE may be selected from among a plurality of candidate STEs included in the step table, based on a step table tag associated with the VPN tag.

In accordance with an aspect of the disclosure, a main processing device includes: at least one processor configured to: request an auxiliary processing device connected to the main processing device to execute an application, determine a memory size for a hashed page table, based on a size of a device memory included in the auxiliary processing device, select a memory block included in the device memory, wherein the memory block has the memory size, transmit, to the auxiliary processing device, an allocation request for allocating the hashed page table to the selected memory block, determine a mapping result between a virtual address of a page corresponding to the application and a physical address included in the device memory, transmit, to the auxiliary processing device, a hashed page table store request based on the mapping result, and transmit an execution request for executing the application using the stored hashed page table, wherein the auxiliary processing device maintains a state in which the memory block of the device memory is allocated to the hashed page table while the application is executed.

The at least one processor may be further configured to: select a hash table entry (HTE) from among a plurality of candidate HTEs included in the hashed page table, based on a hash value of a virtual page number (VPN) tag associated with the virtual address of the page, select a page table entry (PTE) from among a plurality of candidate PTEs included in the selected HTE, based on a PTE offset corresponding to the virtual address, and select a memory region in the device memory in which the page is to be stored, and the hashed page table store request may include a request for storing a physical address of the selected memory region in the selected PTE and storing the page in the selected memory region.

The allocation request may include a hashed page table allocation request, the memory block may include a first memory block, and the at least one processor may be further configured to: transmit, to the auxiliary processing device, a step table allocation request for allocating a second memory block of the device memory to a step table, determine a step size for avoiding a hash collision between a hash value of a virtual page number (VPN) tag of the virtual address associated with the page and a hash value of another VPN tag associated with a virtual address of another page, and transmit, to the auxiliary processing device, a step size store request for storing the step size in the second memory block as at least a portion of the step table.

The at least one processor may be further configured to: select a temporary HTE from among a plurality of candidate HTEs included in the hashed page table, based on the hash value of the VPN tag of the virtual address, based on a state of the temporary HTE being an invalid state, or based on the state of the temporary HTE being a valid state and a tag of the temporary HTE being same as the VPN tag, select the temporary HTE as the HTE, based on the state of the temporary HTE being the valid state and the tag of the temporary HTE being different from the VPN tag, perform one or more iterations until the temporary HTE is selected as the HTE, wherein each iteration of the one or more iterations may include changing the temporary HTE based on a stride, and after the HTE is selected, determine a number of the one or more iterations as the step size.

Additional aspects may be set forth in part in the description which follows and, in part, may be apparent from the description, and/or may be learned by practice of the presented embodiments.

BRIEF DESCRIPTION OF THE DRAWINGS

The above and/or other aspects, features, and advantages of certain embodiments of the present disclosure may be more apparent from the following description taken in conjunction with the accompanying drawings, in which.

DETAILED DESCRIPTION

Figure 1:
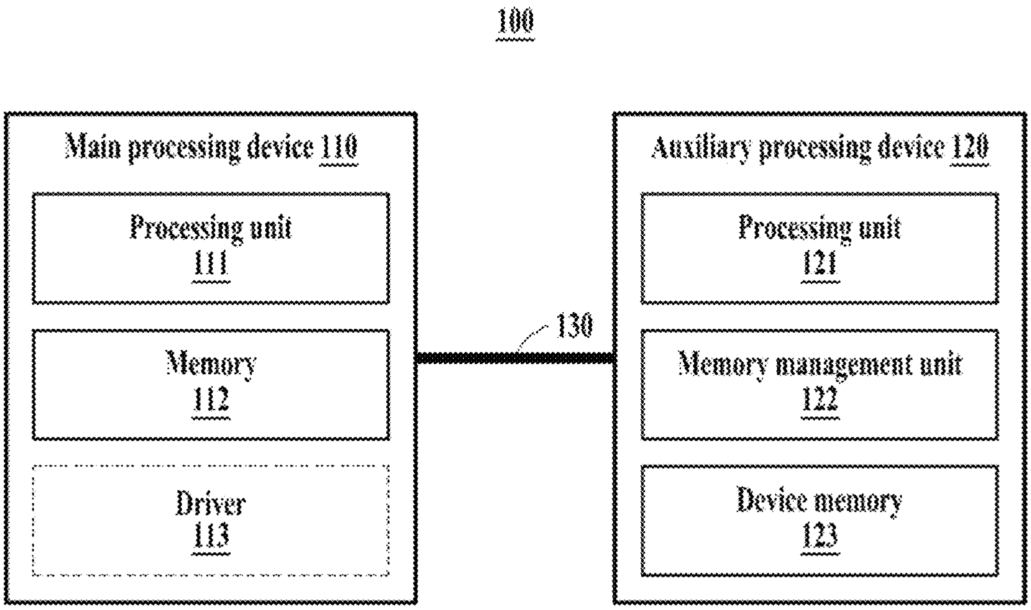
FIG. 1 is a diagram illustrating an example of a heterogeneous computing system according to various embodiments.

The following structural or functional descriptions of example embodiments are provided to merely describe the example embodiments, and the scope of disclosure is not limited to the particular examples provided below. Various changes and modifications can be made thereto by those of ordinary skill in the art to which the disclosure pertains.

Although terms such as "first" or "second" are used to explain various components, the components are not limited to these terms. These terms should be used only to distinguish one component from another component. For example, a "first" component may be referred to as a "second" component, or similarly, and the "second" component may be referred to as the "first" component within the scope of the right according to the concept of the present disclosure.

It is to be understood that when a component is referred to as being "connected to" another component, the component may be directly connected or coupled to the other component, or intervening components may be present.

As used herein, the singular forms are intended to include the plural forms as well, unless the context clearly indicates otherwise. It should be further understood that the terms "comprises," "comprising," "includes," and/or "including," when used in this specification, specify the presence of stated features, integers, steps, operations, elements, components, or a combination thereof, but do not preclude the presence or addition of one or more other features, integers, steps, operations, elements, components, and/or groups thereof.

Unless otherwise defined herein, all terms used herein including technical or scientific terms may have the same meanings as those generally understood by one of ordinary skill in the art. Terms defined in dictionaries generally used should be construed to have meanings matching with contextual meanings in the related art and are not to be construed as an ideal or excessively formal meaning unless otherwise defined herein.

Hereinafter, example embodiments are described in detail with reference to the accompanying drawings. When describing the example embodiments with reference to the accompanying drawings, like reference numerals refer to like components, and a repeated description related thereto may be omitted.

FIG. 1 is a diagram illustrating an example of a heterogeneous computing system, according to various embodiments.

In one or more embodiments, a heterogeneous computing system 100 may include a main processing device 110, an auxiliary processing device 120, and an interconnect 130.

The main processing device 110 may manage various operations including centralized control, general computation, logical control, and/or scheduling of the heterogeneous computing system 100. The main processing device 110 may be optimized for serial processing to effectively perform complex control flows and/or multi-threaded management. The main processing device 110 may manage resources across the heterogeneous computing system 100, such as, for example, memory management and input/output control. For example, the main processing device 110 may be responsible for allocating tasks (e.g., executing an application) to the auxiliary processing device 120. The main processing device 110 may include, for example, a central processing unit (CPU).

The auxiliary processing device 120 may cooperate with the main processing device 110 to perform a large number of operations at high speed. The auxiliary processing device 120 may be optimized for performing graphics operations and/or data-intensive calculations and/or computations that use parallel processing. For example, the auxiliary processing device 120 may perform massive parallel operations, such as vector and matrix operations, to reduce the computational load on the main processing device 110. In one or more embodiments, the auxiliary processing device 120 may outperform the main processing device 110 in some specialized tasks such as graphics rendering and/or artificial intelligence (AI) model inference and learning.

The interconnect 130 may support data transfer between the main processing device 110 and the auxiliary processing device 120. In one or more embodiments, the interconnect 130 may include a peripheral component interconnect (PCI) express (PCIe) interface and/or an NVLink interface. The PCIe interface, which may be a type of general-purpose high-speed serial interface, may be used to transfer data between the main processing device 110 and the auxiliary processing device 120 with relatively high bandwidth and low latency. The NVLink interface, which may be a type of interface designed for high-performance communication between the main processing device 110 and the auxiliary processing device 120, may provide higher bandwidth compared to the PCIe interface. The NVLink interface may maximize performance in computation-intensive tasks. The NVLink interface may support more efficient data access between the main processing device 110 and the auxiliary processing device 120 while maintaining a high data transfer rate between the main processing device 110 and the auxiliary processing device 120. In particular, the NVLink interface may be optimized for memory sharing and computation-intensive tasks and may contribute to reducing data transfer bottlenecks between the main processing device 110 and the auxiliary processing device 120.

In various embodiments of the present disclosure, the main processing device 110 may be represented as, or correspond to, a CPU, and the auxiliary processing device 120 may be represented as, or correspond to, a graphics processing unit (GPU). The main processing device 110 may also be represented as, or correspond to, a host device, and the auxiliary processing device 120 may also be represented as, or correspond to, a device or an electronic device. The main processing device 110 may also be represented as, or correspond to, a processor, and the auxiliary processing device 120 may also be represented as, or correspond to, an accelerator (e.g., a hardware accelerator). The main processing device 110 may be represented as, or correspond to, a main processor, and the auxiliary processing device 120 may be represented as, or correspond to, an auxiliary processor.

In one or more embodiments, the main processing device 110 may include a processing unit 111, a memory 112, and a driver 113.

The processing unit 111 (e.g., core) may perform basic computations (or operations) of the heterogeneous computing system 100. The processing unit 111 may efficiently manage general operations of the heterogeneous computing system 100 in addition to interacting with the auxiliary processing device 120.

The memory 112 may include a memory for temporarily storing and accessing task-related data of the heterogeneous computing system 100. The memory 112 may rapidly provide data used by the main processing device 110 to perform its tasks and may also play a role in data buffering for data exchange with the auxiliary processing device 120.

The driver 113 may include a GPU driver that controls operations of the auxiliary processing device 120. The driver 113 may be a software component that manages command transmission, memory allocation, data exchange, or the like between the main processing device 110 and the auxiliary processing device 120. The driver 113 may assist the main processing device 110 such that the main processing device 110 effectively utilizes the resources of the auxiliary processing device 120. For example, the driver 113 may manage the state of the auxiliary processing device 120 and may transmit a task request for the auxiliary processing device 120 generated from the main processing device 110 to the auxiliary processing device 120.

In one or more embodiments, the auxiliary processing device 120 may include a processing unit 121, a memory management unit 122, and a device memory 123.

The processing unit 121 may include a streaming multiprocessor (SM). Each SM may include a plurality of operational cores and may perform tasks using parallel processing at high speed.

The memory management unit 122 may manage an internal memory space (e.g., the device memory 123) and an external memory space of the auxiliary processing device 120 to support efficient data access. The memory management unit 122 may perform address translation to translate a virtual address of a memory region into a physical address. As described below, the memory management unit 122 may perform the address translation by referring to a page table (e.g., a hashed page table) provided by the main processing device 110. In various embodiments of the present disclosure, the memory management unit 122 may also be represented as a GPU memory management unit (GMMU).

The device memory 123 may include a memory space for storing and accessing data used for operations (or computations) performed by the auxiliary processing device 120. The device memory 123 may be designed to enable high-speed data access. For example, the device memory 123 may include a high-performance graphics double data rate (GDDR) memory or a high bandwidth memory (HBM). The device memory 123 may store data used in the process of performing an operation (or computation) and an operation result acquired by performing the operation.

Figure 2:
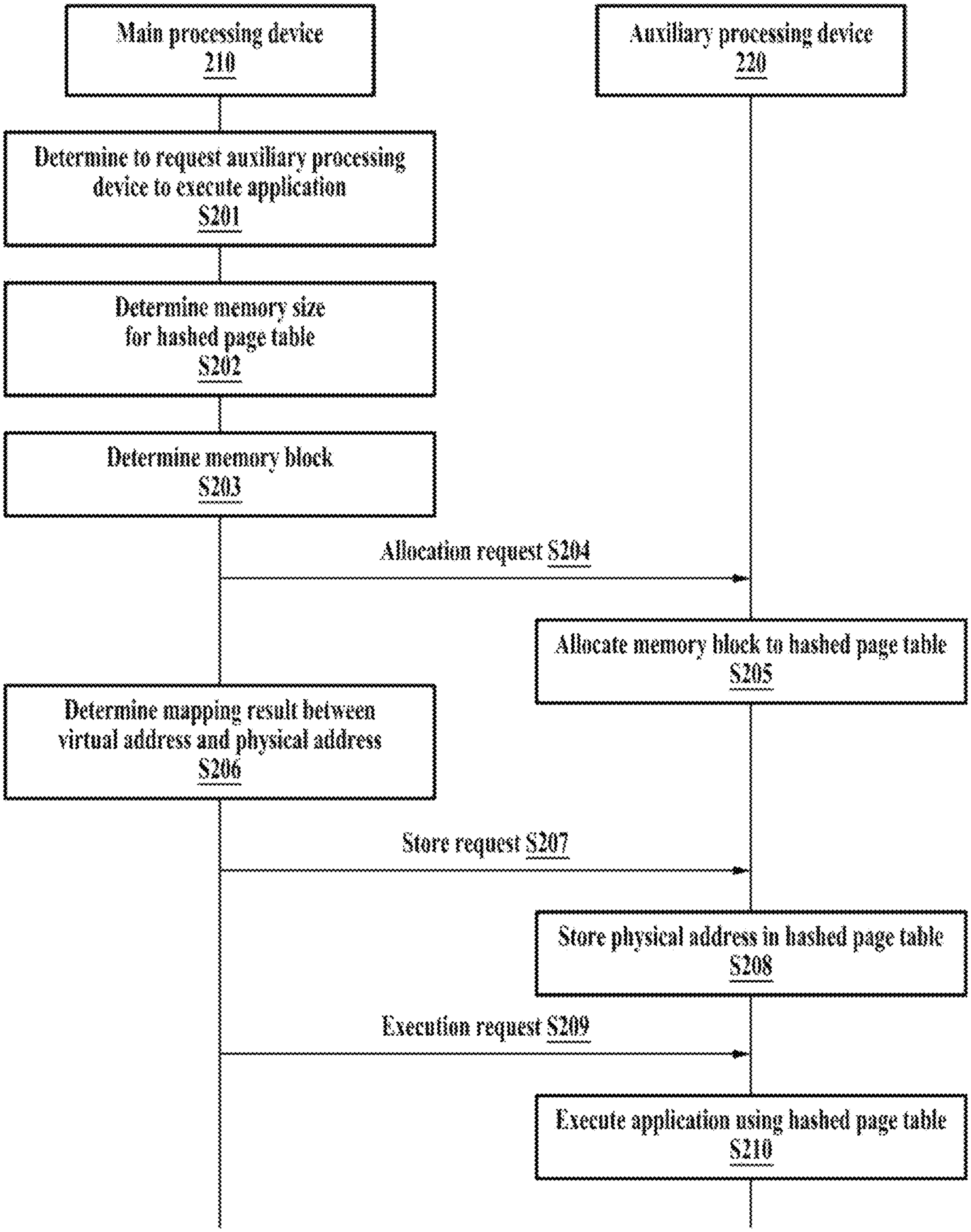
FIG. 2 is a system diagram illustrating an example in which a main processing device of a heterogeneous computing system provides a hashed page table of an auxiliary processing device according to various embodiments.

FIG. 2 is a system diagram illustrating an example in which a main processing device of a heterogeneous computing system provides a hashed page table of an auxiliary processing device according to various embodiments.

In one or more embodiments, a heterogeneous computing system (e.g., the heterogeneous computing system 100 of FIG. 1) may include a main processing device 210 (e.g., the main processing device 110 of FIG. 1) and an auxiliary processing device 220 (e.g., the auxiliary processing device 120 of FIG. 1).

At operation S201, the main processing device 210 may determine to request the auxiliary processing device 220 connected to the main processing device 210 to execute an application. Before requesting the auxiliary processing device 220 to execute the application, the main processing device 210 may allocate a memory block (also referred to herein as a "first memory block" in various embodiments of the present disclosure) for a hashed page table to be used to execute the application, and may configure (e.g., determine) the hashed page table. The main processing device 210 may configure the hashed page table by executing a driver (e.g., the driver 113 of FIG. 1) stored in the main processing device 210. An example of a process for configuring the hashed page table by the main processing device 210 is described in more detail below.

At operation S202, the main processing device 210 may determine a memory size for the hashed page table, based on a size of a device memory included in the auxiliary processing device 220. In one or more embodiments, the main processing device 210 may request, using the driver, the size of the device memory of the auxiliary processing device 220. Based on the size of the device memory of the auxiliary processing device 220, the main processing device 210 may determine a memory size for storing hash table pages based on the number of pages loadable into the device memory of the auxiliary processing device 220.

At operation S203, the main processing device 210 may determine or select a memory block having the determined memory size, from among memory blocks included the device memory of the auxiliary processing device 220.

At operation S204, the main processing device 210 may transmit, to the auxiliary processing device 220, an allocation request (also referred to herein as a "hashed page table allocation request" in various embodiments of the present disclosure) for allocating the hashed page table to the determined memory block. The auxiliary processing device 220 may receive the hashed page table allocation request.

At operation S205, based on the allocation request being received from the main processing device 210, a memory management unit of the auxiliary processing device 220 may allocate, to the hashed page table, the memory block of the device memory that has the memory size determined based on the size of the device memory.

In one or more embodiments, the auxiliary processing device 220 may further include a page table base register that may store a physical base address of the memory block of the device memory storing therein the hashed page table. The physical base address may refer to a base address of a physical address. In response to the allocation request received from the main processing device 210, the memory management unit of the auxiliary processing device 220 may store the physical base address of the memory block in the page table base register.

As described below, while the auxiliary processing device 220 is executing the application, the size of the hashed page table may be fixed to the memory size determined at operation S202. Further, while the auxiliary processing device 220 is executing the application, the hashed page table may remain stored in the memory block determined or selected at operation S203. For example, while the auxiliary processing device 220 is executing the application, a storage location of at least a portion of the hashed page table may not change (e.g., the hashed page table may not be moved and/or expanded, and may therefore be maintained) by storing the hashed page table in another memory block, and the at least a portion of the memory block allocated to the hashed page table may not be deallocated.

At operation S206, the main processing device 210 may determine a mapping result, which is a result of mapping, between a virtual address of a page of the application and a physical address of the device memory of the auxiliary processing device 220. The application may include a plurality of pages. Each page may include one or more instructions executed by a processing unit of the auxiliary processing device 220.

In various embodiments of the present disclosure, the virtual address of the page may refer to a virtual base address of the page. Based on the virtual address of the page of the application, the main processing device 210 may determine the mapping result between the virtual address of the page and the physical address of the device memory of the auxiliary processing device 220. An example of a process for determining a mapping result by the main processing device 210 is described in more detail below with reference to FIGS. 3 and 4.

At operation S207, the main processing device 210 may transmit, to the auxiliary processing device 220, a store request for the hashed page table (which may be referred to as a "hashed page table store request") based on the mapping result between the virtual address of the page of the application and the physical address of the device memory of the auxiliary processing device 220. The auxiliary processing device 220 may receive the hashed page table store request from the main processing device 210.

At operation S208, based on the hashed page table store request being received from the main processing device 210, the memory management unit of the auxiliary processing device 220 may store the physical address included in the mapping result in the hashed page table (e.g., a page table entry (PTE)). The memory management unit of the auxiliary processing device 220 may store (e.g., load) the page into a memory region of the physical address of the device memory based on the mapping result between the virtual address of the page and the physical address of the device memory.

At operation S209, the main processing device 210 may transmit an execution request for executing the application, using the hashed page table. The auxiliary processing device 220 may receive the execution request for the application.

At operation S210, in response to or based on receiving the execution request for the application from the main processing device 210, the processing unit of the auxiliary processing device 220 may execute the application using the hashed page table. In this case, executing the application may include executing at least some of a plurality of pages included in the application. Also, executing the page may include performing address translation to translate a virtual address of a page into a physical address of the page using the hashed page table, and accessing a memory region of the physical address and reading the page.

In one or more embodiments, the memory management unit of the auxiliary processing device 220 may maintain a state in which the memory block of the device memory is allocated to the hashed page table while the processing unit of the auxiliary processing device 220 is executing the application. The memory management unit of the auxiliary processing device 220 may not additionally allocate, to the hashed page table, a memory block that is different from the memory block of the device memory allocated to the hashed page table. For example, the main processing device 210 may request the auxiliary processing device 220 to not additionally allocate, to the hashed page table, a memory block that is different from the memory block of the device memory allocated to the hashed page table.

In one or more embodiments, in response to or based on a memory request for a page stored in an external memory, in addition to an internal memory (e.g., the memory 112 of FIG. 1) of the main processing device 210, the main processing device 210 may add a hash table entry (HTE) to the hashed page table that is predetermined to perform the address translation, and reallocate a memory block for the hashed page table to store the added HTE. In the process of reallocating the memory block for the hashed page table, the main processing device 210 may migrate (e.g., read, store) the prestored hashed page table into the reallocated memory block, and/or perform merging between the preset hashed page table and the added HTE.

However, because the auxiliary processing device 220 may process only a memory request for a page stored in the internal memory (e.g., the device memory 123 of FIG. 1) of the auxiliary processing device 220, and may not process a memory request for the external memory, the hashed page table of the auxiliary processing device 220 may thus have a fixed size based on the size of the device memory of the auxiliary processing device 220. For example, once the size of the memory block allocated to the hashed page table of the auxiliary processing device 220 is set for the application, the memory region accessed by the auxiliary processing device 220 may be fixed to the device memory, and thus no addition of an HTE may occur, and reallocation of a memory block and/or the migration and merging of the hashed page table may not occur.

As a result, when the memory block for the hashed page table is allocated as the application is executed, the auxiliary processing device 220 may maintain the allocation of the memory block until the execution of the application is completed. For example, the auxiliary processing device 220 may execute the application using the hashed page table having the fixed size (e.g., the memory size determined based on the size of the device memory of the auxiliary processing device 220).

Figure 3:
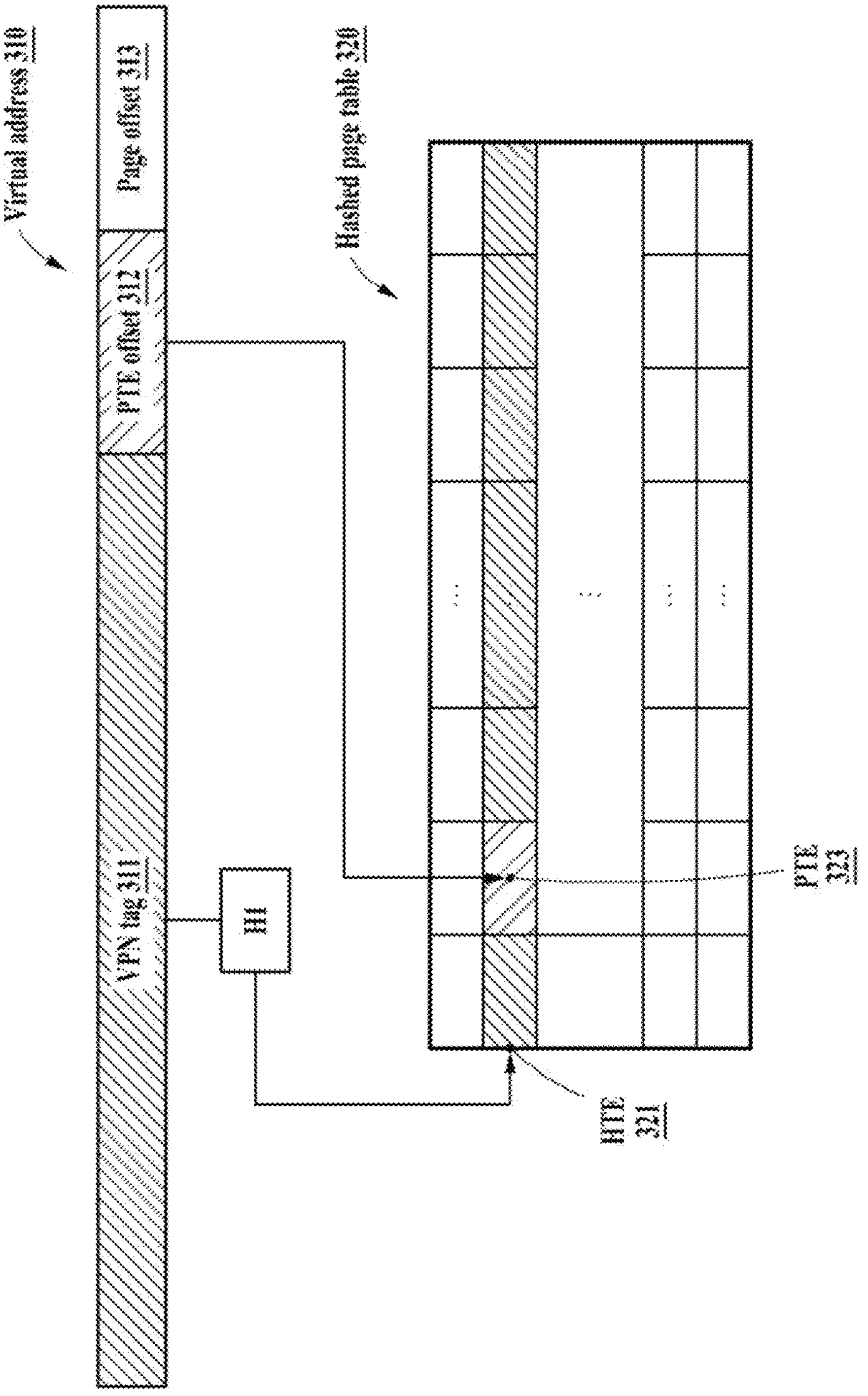
FIG. 3 is a diagram illustrating an example operation of acquiring a physical address corresponding to a virtual address using a hashed page table of an auxiliary processing device according to various embodiments.

FIG. 3 is a diagram illustrating an example operation for acquiring a physical address corresponding to a virtual address using a hashed page table of an auxiliary processing device according to various embodiments.

In one or more embodiments, a hashed page table 320 may include a plurality of HTEs. Each HTE 321 may include a plurality of page table entries (PTEs).

An example operation of acquiring a physical address corresponding to a virtual address 310 using the hashed page table 320 when an auxiliary processing device (e.g., the auxiliary processing device 120 of FIG. 1 and the auxiliary processing device 220 of FIG. 2) acquires the virtual address 310 is first described below.

In one or more embodiments, the virtual address 310 may include a virtual page number (VPN) tag 311, a PTE offset 312, and a page offset 313. The virtual address 310 may have a predetermined number of bits (e.g., 48 bits). The VPN tag 311 may have bits based on a memory size in a hash unit of the virtual address 310. For example, based on the hash unit being 2 megabytes (MB) (e.g., $2^{21}$ bytes), the VPN tag 311 may have 27 bits (e.g., (48-21) bits). The PTE offset 312 may be involved with each HTE 321 having the number of bits based on the number of the plurality of PTEs. For example, based on each HTE 321 including 512 PTEs, the PTE offset 312 may include 9 bits. The page offset 313 may have the number of bits based on a size of a page. For example, in response to or based on the size of the page being 4 kilobytes (KB) (e.g., $2^{12}$ bytes), the page offset 313 may include 12 bits.

The VPN tag 311 may be used to determine an HTE 321 corresponding to the virtual address 310 from among a plurality of HTEs. The HTE 321 corresponding to the virtual address 310 may refer to an HTE 321 that includes a PTE 323 that may store a physical address corresponding to the virtual address 310. Here, one VPN tag 311 may correspond to one HTE 321.

In one or more embodiments, the auxiliary processing device may determine or select the HTE 321 corresponding to the virtual address 310 from among a plurality of candidate HTEs in the hashed page table 320 based on the VPN tag 311. The auxiliary processing device may acquire a hash value of the VPN tag 311 by applying a hash function H1 to the VPN tag 311 of the virtual address 310. Based on a result of applying the hash value of the VPN tag 311 to a physical base address (e.g., a physical base address of a first memory block) stored in a page table base register, the auxiliary processing device may determine a physical address of the HTE 321 corresponding to the virtual address 310.

In one or more embodiments, the auxiliary processing device may acquire the physical address of the HTE 321 corresponding to the virtual address 310 by applying, to the physical base address stored in the page table base register, the hash value of the VPN tag 311 of the virtual address 310 and a step size corresponding to the VPN tag 311. The step size may refer to a value for avoiding a hash collision where hash values of multiple VPN tags correspond to a single HTE.

For example, the physical address of the HTE 321 corresponding to the virtual address 310 may be acquired using the following Equation 1.

$$HTE_{pba}=PTBR+H(\text{VPN tag})+\text{step}\times\text{stride} \qquad \text{[Equation 1]}$$

In Equation 1 above, $HTE_{pba}$ denotes a physical base address of the HTE 321, PTBR denotes a physical base address (e.g., a physical base address of the hashed page table 320) stored in the page table base register, H (VPN tag) denotes a hash value of the VPN tag 311, step denotes a step size, and stride denotes a stride. Examples of the step size and the stride are described in more detail below with reference to FIG. 4.

The PTE offset 312 may determine the PTE 323 that may store the physical address corresponding to the virtual address 310 from among a plurality of PTEs included in the HTE 321 corresponding to the virtual address 310. After selecting the HTE 321 corresponding to the virtual address 310, the auxiliary processing device may determine the PTE 323 based on the PTE offset 312 from among candidate PTEs included in the HTE 321.

The page offset 313 may represent a distance from a virtual base address of the page to the virtual address 310. The auxiliary processing device may acquire the physical address corresponding to the virtual address 310 by applying (e.g., adding) the page offset 313 to a base address of a physical address stored in the hashed page table 320 (also referred to as a "physical base address" in various embodiments of the present disclosure).

An example in which a main processing device (e.g., the main processing device 110 of FIG. 1 and the main processing device 210 of FIG. 2) of one or more embodiments determines a mapping relationship between a virtual address of a page and a physical address of the device memory of the auxiliary processing device and transmits the determined relationship to the auxiliary processing device is described below. In various embodiments of the present disclosure, determining a mapping relationship between the virtual address 310 of the page and the physical address may be represented as, or may correspond to, allocating the physical address (or the PTE 323) to the virtual address 310 (or the page). The virtual address 310 of the page may include the VPN tag 311 and the PTE offset 312, and may not include the page offset 313. In one or more embodiments, the virtual address 310 of the page may include the VPN tag 311, the PTE offset 312, and the page offset 313, and the page offset 313 may be set to a default value (e.g., zero (0)).

In one or more embodiments, the main processing device may select the HTE 321 from among a plurality of candidate HTEs included in the hashed page table 320 based on a hash value of the VPN tag 311 of the virtual address 310 of the page. For example, the main processing device may acquire the hash value of the VPN tag 311 by applying a hash function (also referred to herein as a "VPN tag hash function") to the VPN tag 311 of the virtual address 310 of the page. Based on the hash value of the VPN tag 311, the main processing device may acquire a physical address of the HTE 321.

The main processing device may select a PTE from among a plurality of candidate PTEs included in the selected HTE 321 based on the PTE offset 312 of the virtual address 310. The main processing device may determine a memory region in the device memory of the auxiliary processing device in which the page is to be stored. The main processing device may map the virtual address 310 of the page to a physical address of the determined memory region. The main processing device may store the physical address of the determined memory region in the selected PTE.

The main processing device may transmit, to the auxiliary processing device, a store request corresponding to the hashed page table 320 (or a hashed page table store request) for storing the physical address of the determined memory region in the selected PTE and storing the page in the determined memory region.

Figure 4:
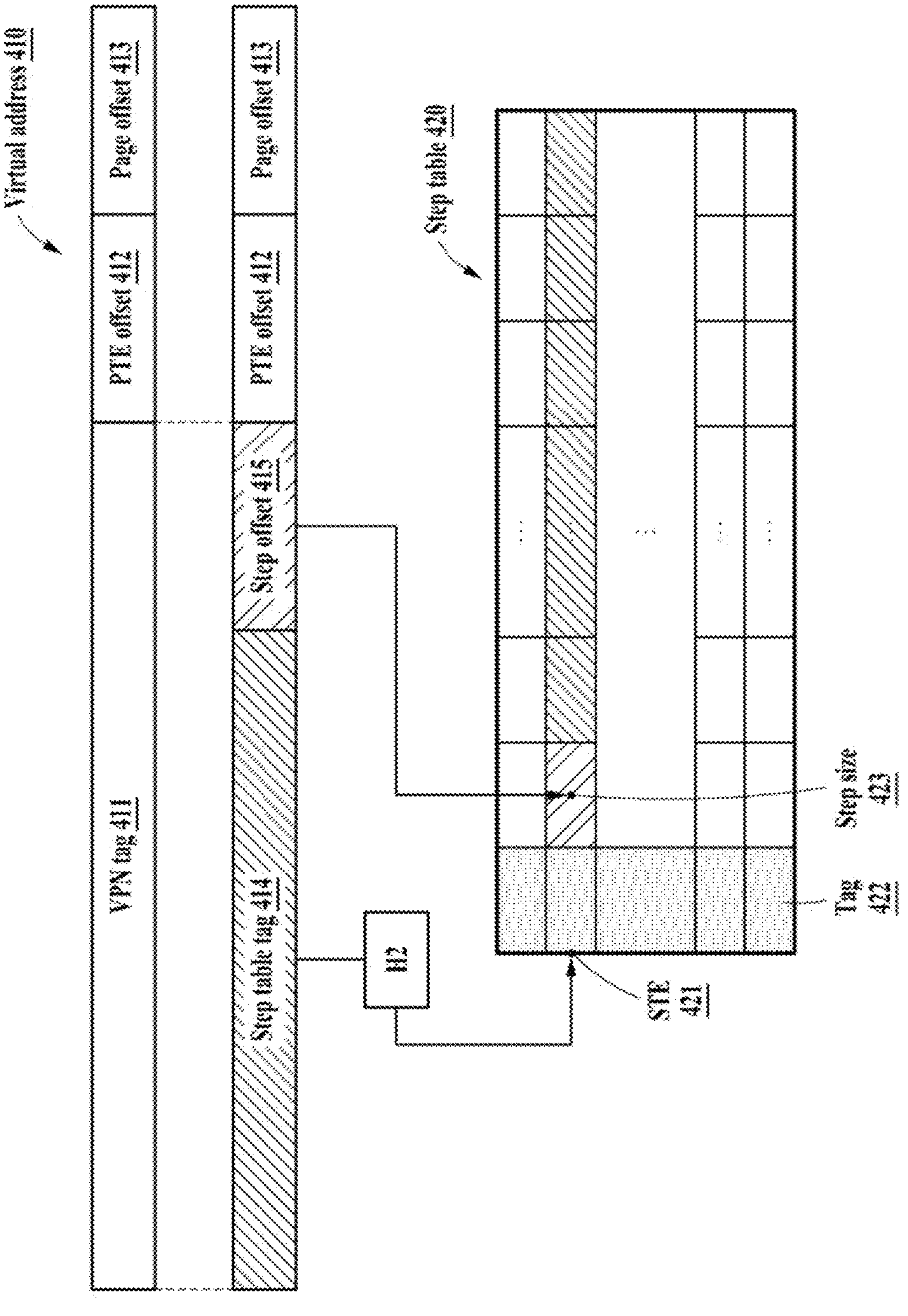
FIG. 4 is a diagram illustrating an example operation of acquiring a step size for avoiding a hash collision of a hash value of a virtual page number (VPN) tag using a step table of an auxiliary processing device according to various embodiments.

FIG. 4 is a diagram illustrating an example operation of acquiring a step size for avoiding a hash collision of a hash value of a VPN tag using a step table of an auxiliary processing device according to various embodiments.

In one or more embodiments, a step table 420 may include a plurality of step table entries (STEs). Each STE 421 may include a plurality of step sizes. A step size may refer to a value for avoiding a hash collision as the step size is applied to a hash value of a corresponding VPN tag 411.

An example operation of acquiring a step size corresponding to a virtual address 410 (e.g., the virtual address 310 of FIG. 3) using the step table 420 when an auxiliary processing device (e.g., the auxiliary processing device 120 of FIG. 1 and the auxiliary processing device 220 of FIG. 2) acquires the virtual address 410 is first described below.

In one or more embodiments, the virtual address 410 may include the VPN tag 411 (which may correspond to the VPN tag 311 of FIG. 3), a PTE offset 412 (which may correspond to the PTE offset 312 of FIG. 3), and a page offset 413 (which may correspond to the page offset 313 of FIG. 3).

The VPN tag 411 of the virtual address 410 may include a step table tag 414 and a step offset 415. The step offset 415 may have a number of bits based on the number of step sizes included in each STE 421. For example, based on each STE 421 including 16 step sizes, the step offset 415 may have 4 bits.

The step table tag 414 may be used to determine or select an STE 421 corresponding to the virtual address 410 from among a plurality of STEs. The STE 421 corresponding to the virtual address 410 may refer to an STE 421 that includes the step size 423 corresponding to the VPN tag 411 of the virtual address 410. Here, one step table tag 414 may correspond to one STE 421, and one VPN tag 411 may correspond to one step size 423.

In one or more embodiments, the auxiliary processing device may determine or select, based on the step table tag 414, the STE 421 corresponding to the virtual address 410 from among a plurality of candidate STEs included in the step table 420.

For example, the auxiliary processing device may determine or select, using the step table tag 414, the STE 421 corresponding to the virtual address 410 from among the plurality of STEs, by a hashing technique. The auxiliary processing device may acquire a hash value of the step table tag 414 by applying a hash function H2 to the step table tag 414 of the virtual address 410. In various embodiments of the present disclosure, a hash function (e.g., the hash function H1 of FIG. 3) applied to the VPN tag 411 and a hash function (e.g., the hash function H2 of FIG. 4) applied to the step table tag 414 may be different.

The auxiliary processing device may further include a step table base register that may store a physical base address of a memory block (also referred to herein as a "second memory block" in various embodiments of the present disclosure) storing therein the step table 420. The auxiliary processing device may acquire a physical address of a temporary STE by applying (e.g., adding) the hash value of the step table tag 414 to a physical base address stored in the step table base register.

By comparing a tag 422 of the temporary STE and the step table tag 414, the auxiliary processing device may verify whether the temporary STE is the STE 421 corresponding to the virtual address 410. For example, based on the tag 422 of the temporary STE being the same as the step table tag 414, the auxiliary processing device may determine or select the temporary STE as the STE 421 corresponding to the virtual address 410. For example, when the tag 422 of the temporary STE is different from the step table tag 414 (e.g., when there is a hash collision in the hash value of the step table tag 414), the auxiliary processing device may change the temporary STE to a different STE 421 and may perform the verification again based on the tag 422 of the changed temporary STE. In this case, changing the temporary STE to the other STE 421 may be performed using a technique (e.g., open addressing) for solving such a hash collision.

After determining or selecting the STE 421 (or a physical address of the STE 421) corresponding to the virtual address 410, the auxiliary processing device may determine the step size 423 based on the step offset 415 of the VPN tag 411 from among a plurality of candidate step sizes included in the STE 421.

An example of how a main processing device of one or more embodiments determines the step size 423 for the VPN tag 411 and transmits the determined step size 423 to the auxiliary processing device is described below.

In one or more embodiments, the main processing device may transmit, to the auxiliary processing device, a step table allocation request for allocating a second memory block of a device memory of the auxiliary processing device to the step table 420. The step table allocation request may include a physical address of the second memory block. The auxiliary processing device may receive the step table allocation request from the main processing device.

In response to or based on the step table allocation request being received from the main processing device, the auxiliary processing device may allocate the second memory block of the device memory to the step table 420. The auxiliary processing device may store a physical base address of the second memory block in the step table base register.

The main processing device (e.g., the main processing device 110 of FIG. 1 and the main processing device 210 of FIG. 2) may determine the step size 423 for avoiding a hash collision between a hash value of the VPN tag 411 and a hash value of another VPN tag of the virtual address 410 of another page.

For example, the main processing device may select a temporary HTE from among a plurality of candidate HTEs included in a hashed page table based on the hash value of the VPN tag 411 of the virtual address 410. The main processing device may determine, based on a state of the temporary HTE, whether a hash collision has occurred for the temporary HTE. The state of the temporary HTE may indicate whether the temporary HTE is allocated or unallocated to a VPN.

The main processing device may determine or select the temporary HTE as the HTE based on the selected temporary HTE being in an invalid state. In this case, the state of an HTE (or a candidate HTE) may be the invalid state if the candidate HTE is not allocated to a VPN tag and/or has never been allocated to a VPN tag. For example, an HTE in the invalid state may be available to be allocated to the VPN tag 411. When the selected temporary HTE is in the invalid state, the main processing device may allocate the VPN tag 411 to the selected temporary HTE.

When the temporary HTE is in a valid state, the main processing device may verify whether the temporary HTE is the HTE corresponding to the virtual address 410 by comparing a tag of the temporary HTE to the VPN tag 411.

For example, based on the temporary HTE being in the valid state and the tag of the temporary HTE being the same as the VPN tag 411, the main processing device may determine or select the temporary HTE as the HTE.

For example, based on the temporary HTE being in the valid state and the tag of the temporary HTE being different from the VPN tag 411, the main processing device may change the selected temporary HTE based on a stride. When the auxiliary processing device determines a physical address of the HTE based solely on the hash value of the VPN tag 411 in response to the tag of the temporary HTE being different from the VPN tag 411, a hash collision may occur.

As a result, the main processing device may change the temporary HTE based on the stride to prevent the hash collision of the VPN tag 411. The main processing device may set, as the temporary HTE, an HTE stored at a physical address acquired by applying (e.g., adding) the stride to a physical address (e.g., a value of applying the hash value of the VPN tag 411 to a physical base address stored in a page table base register) of the temporary HTE. The stride may refer to a value for changing the temporary HTE, which may be determined by design.

The main processing device may iterate the stride-based changing of the temporary HTE until the HTE is determined or selected. For example, the main processing device may iterate changing the temporary HTE based on the stride until a temporary HTE is found that is in the invalid state, or until a temporary HTE is found that is in the valid state and the tag of the temporary HTE is the same as the VPN tag 411.

After determining or selecting the HTE, the main processing device may determine, as a step size, the number of iterations of changing the temporary HTE based on the stride. As a result, the step size may be determined as a value for avoiding a hash collision between the hash value of the VPN tag 411 and a hash value of another VPN tag.

The main processing device may transmit, to the auxiliary processing device, a step size store request for storing the determined step size in the second memory block as at least a portion of the step table 420. For example, the main processing device may request the auxiliary processing device to store the determined step size in a step size region. The main processing device may select the STE 421 from among a plurality of candidate STEs included in the step table 420, based on the step table tag 414 of the VPN tag 411. The main processing device may select the step size region from among a plurality of candidate step size regions included in the STE 421, based on the step offset 415 of the VPN tag 411. A step size region (or a candidate step size region) may refer to a memory region in which one step size of the step table 420 is stored or one step size of the step table 420 is to be stored. The main processing device may transmit, to the auxiliary processing device, the step size store request for storing the determined step size in the selected step size region.

In response to or based on the step size store request being received from the main processing device, the auxiliary processing device may store the step size 423 for avoiding a hash collision between the hash value of the VPN tag 411 and a hash value of another VPN tag in the second memory block as at least a portion of the step table 420.

In one or more embodiments, the main processing device may allocate a PTE to a virtual address of a page according to Algorithm 1 below.

Algorithm 1 PTE Allocation

```
1:  Step ← 0
2:  Del Addr ← null
3:  while true do
4:     Current Addr ← Base Addr + Hash Value + (Step × Stride)
5:     if Valid then
6:        if VPN tag == Tag then
7:           Allocate PTE                  ▹ HPT entry already exists
8:           break
9:        else
10:          Step ← Step + 1                ▹ Tag mismatch
11:       end if
12:    else if Deleted then
13:       if Del Addr == null then
14:          Del Addr ← Current Addr     ▹ Save first deleted entry
                                          address
15:       end if
16:       Step ← Step + 1                 ▹ Deleted entry
17:    else if not Valid then
18:       if Oversubscription then
19:          Page eviction
20:       else if Current HPT entries ≥ Max. HPT entries then
21:          Remote PTE eviction
22:       end if
23:       if Del Addr! = null then
24:          Current Addr ← Del Addr        ▹ Reuse deleted entry
25:       end if
```

-continued

Algorithm 1 PTE Allocation

```
26:          Valid ← true               ▹ Allocate new HPT entry
27:          Allocate PTE
28:          break
29:       end if
30:    end while
```

At line 1, a step size (Step) may be initialized to zero (0), and at line 2, a physical address (Del Addr) of a hash page entry in a deleted state may be initialized to null.

In one or more embodiments, a state of the hash page entry may be set to one of a valid state, an invalid state (or not valid state), and the deleted state. The valid state may be a state in which a hash page entry is allocated to a VPN tag. The invalid state may indicate that no hash page entries are allocated to a VPN tag after the execution of an application. The deleted state may be a state in which a hash page entry is allocated to a VPN tag and is then deallocated after the execution of an application.

At line 4, the main processing device may determine a physical address (Current Addr) of a temporary HTE based on a physical base address (Base Addr) of an HTE, a hash value (Hash Value) of a VPN tag, a step size (Step), and a stride (Stride).

At lines 5 through 10, when the temporary HTE is in the valid state (Valid), the main processing device may compare the VPN tag and a tag of the temporary HTE.

For example, at lines 5 through 8, when the VPN tag is the same as the tag of the temporary HTE, the main processing device may determine the temporary HTE as an HTE corresponding to the virtual address and allocate a PTE corresponding to a PTE offset. For example, the main processing device may allocate, to a page, a memory region in the device memory corresponding to the page of the virtual address and store a physical address of the allocated memory region in the PTE.

For example, at line 9 or line 10, when the VPN tag is different from the tag of the temporary HTE, the main processing device may increase a step size to avoid a hash collision. Based on the increased step size, the main processing device may update the physical address (Current Addr) of the temporary HTE and the temporary HTE and may iterate lines 4 through 29 of Algorithm 1 based on the updated temporary HTE (refer to line 3 of Algorithm 1).

At lines 11 through 15, when the temporary HTE is in the deleted state (Deleted) and the physical address (Del Addr) of the hash page entry in the deleted state is a default value (e.g., null), the main processing device may store a physical base address of a page table of the temporary HTE in the physical address (Del Addr) of the hash page entry in the deleted state. At line 16, when the temporary HTE is in the deleted state, the main processing device may increase the step size. Based on the increased step size, the main processing device may update the physical address (Current Addr) of the temporary HTE and the temporary HTE and may iterate lines 4 through 29 of Algorithm 1 based on the updated temporary HTE (refer to line 3 of Algorithm 1).

According to embodiments, even when the temporary HTE is in the deleted state (Deleted), the main processing device may verify whether a VPN tag of a virtual address is allocated to an HTE to be accessed using a larger step size, without immediately allocating the VPN tag. Thus, as described below, the main processing device may iterate checking the state of the temporary HTE while increasing the step size, and if it finds a temporary HTE in the invalid state (not Valid), may allocate a PTE without further checking the state of the temporary HTE.

At line 17, when the temporary HTE is in the invalid state (not Valid), the main processing device may determine whether there is an oversubscription. At lines 18 through 22, based on an occurrence of the oversubscription being determined, the main processing device may perform a page eviction. At lines 23 through 25, based on the physical address (Del Addr) of the hash page entry in the deleted state not being the default value (e.g., null), the main processing device may allocate (e.g., reuse) the hash page entry corresponding to the physical address of the hash page entry in the deleted state to the VPN tag. At lines 26 through 28, based on the physical address (Del Addr) of the hash page entry in the deleted state being the default value (e.g., null), the main processing device may allocate a temporary hash page entry to the VPN tag. The main processing device may determine or select the temporary hash page entry as the hash page entry corresponding to the virtual address and may change the state of the determined hash page entry to the valid state. The main processing device may allocate a PTE to the hash page entry.

Figure 5:
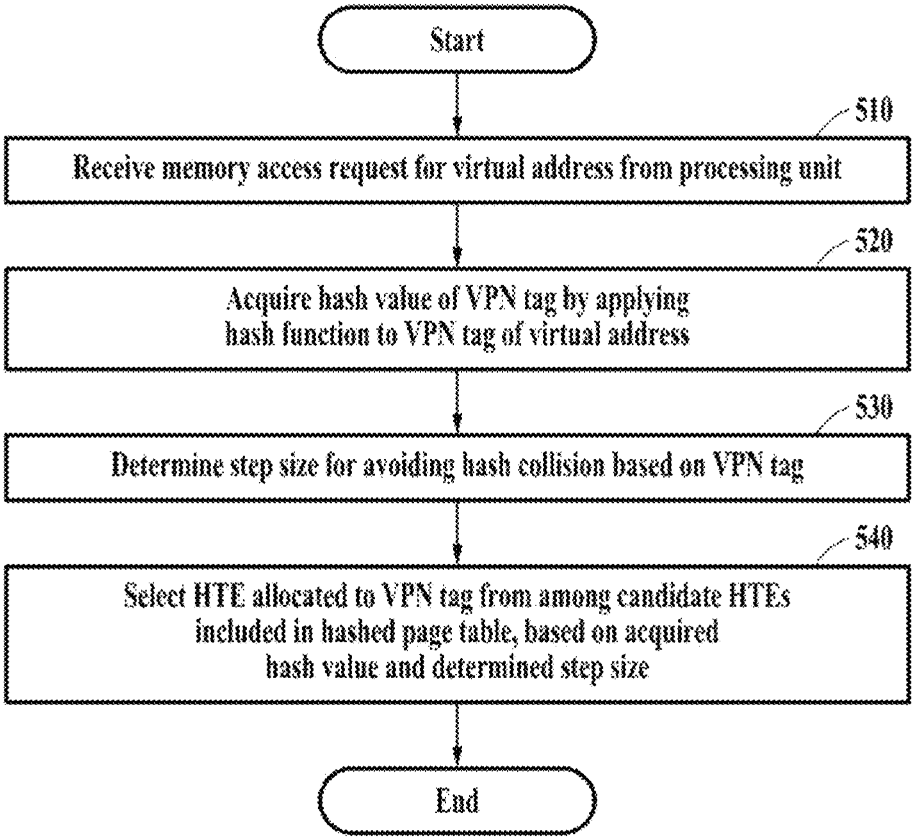
FIG. 5 is a flowchart illustrating an example process performed by an auxiliary processing device to translate a virtual address into a physical address according to various embodiments.

FIG. 5 is a flowchart illustrating an example method performed by an auxiliary processing device to translate a virtual address into a physical address according to various embodiments.

In one or more embodiments, an auxiliary processing device (e.g., the auxiliary processing device 120 of FIG. 1 and the auxiliary processing device 220 of FIG. 2) (also referred to herein as an "electronic device" in various embodiments of the present disclosure) may include a processing unit (e.g., the processing unit 121 of FIG. 1), a memory management unit (e.g., the memory management unit 122 of FIG. 1), and a device memory (e.g., the device memory 123 of FIG. 1). The processing unit of the auxiliary processing device may transmit a memory access request for a virtual address to the memory management unit. The memory management unit may translate the virtual address into a physical address of the device memory and access the device memory based on the physical address.

At operation 510, the memory management unit may receive, from the processing unit, a memory access request for a virtual address. The memory access request may include an access request for accessing a page to be executed while the auxiliary processing device is executing an application. The memory access request may include the virtual address.

At operation 520, the memory management unit may acquire a hash value by applying a hash function to a VPN tag of the virtual address.

At operation 530, the memory management unit may determine, based on the VPN tag, a step size to avoid a hash collision.

As described above with reference to FIG. 4, the memory management unit may determine the step size using a step table. In one or more embodiments, the device memory may further store the step table that may store step sizes for a plurality of candidate pages.

The memory management unit may determine or select, based on a step table tag of the VPN tag, an STE allocated to the step table tag from among a plurality of candidate STEs included in the step table. For example, the auxiliary processing device may further include a step table base register that may store a physical base address of a memory block (e.g., a second memory block) of the device memory storing the step table. The memory management unit may acquire a hash value of the step table tag by applying a step hash function to the step table tag. The memory management unit may acquire a physical base address of the STE based on a value acquired by applying the hash value of the step table tag to the physical base address stored in the step table base register. As described above with reference to FIG. 4, the memory management unit may determine a temporary STE, verify the temporary STE based on a result of comparing a tag of the temporary STE and the step table tag, and acquire the verified temporary STE as the STE.

The device memory may determine, based on a step offset of the VPN tag, a step size allocated to the VPN tag from among a plurality of candidate step sizes included in the determined STE.

In some embodiments, the memory management unit of the auxiliary processing device may need to access the device memory (e.g., the step table) to determine the step size corresponding to the VPN tag. To reduce the number of accesses to the step table, the memory management unit may further include a step cache that may store therein frequently accessed and/or recently accessed STEs among STEs. An example of the use of the step cache is described in more detail below with reference to FIG. 6.

At operation 540, the memory management unit may select, based on the acquired hash value and the determined step size, an HTE allocated to the VPN tag from among a plurality of candidate HTEs included in a hashed page table.

The auxiliary processing device may further include a page table base register that may store therein a physical base address of a memory block of the device memory that may store the hashed page table.

The memory management unit may select, as the HTE allocated to the VPN tag, an HTE corresponding to a physical address acquired as a result of applying the hash value of the VPN tag and the step size to the physical base address of the memory block.

The memory management unit may select a PTE from among a plurality of candidate PTEs included in the selected HTE, based on a PTE offset of the virtual address. The memory management unit may acquire a physical base address of a page corresponding to the virtual address stored in the selected PTE. The page corresponding to the virtual address may refer to a page including a memory region of the virtual address.

The memory management unit may determine a result of applying a page offset of the virtual address to the physical base address of the page as a physical address corresponding to the virtual address. For example, the memory management unit may apply the page offset of the of the virtual address to the physical base address of the page to obtain a result address, and may determine the result address as the physical address corresponding to the virtual address.

Figure 6:
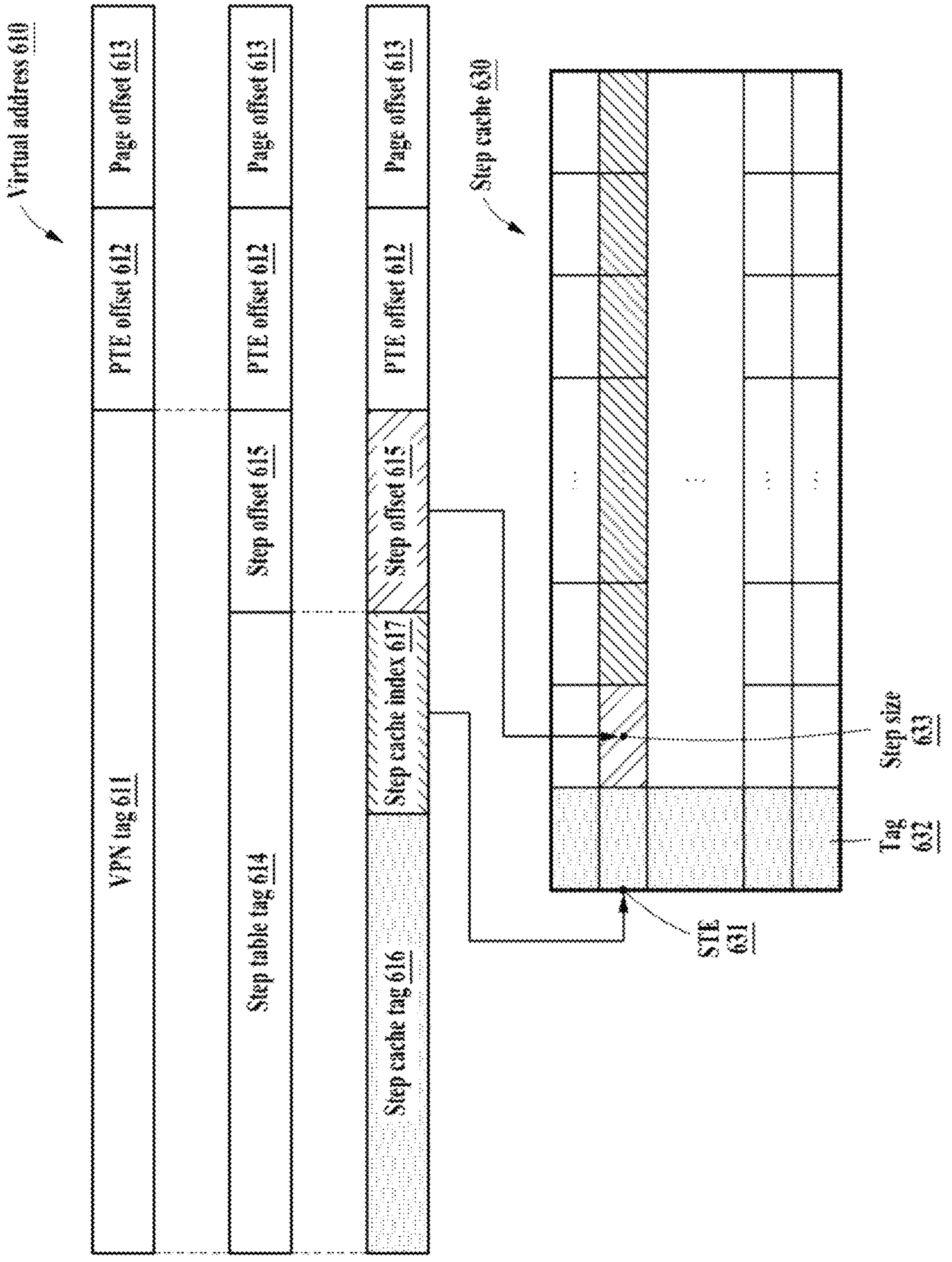
FIG. 6 is a diagram illustrating an example operation performed by an auxiliary processing device to determine a step size using a step cache according to various embodiments.

FIG. 6 is a diagram illustrating an example operation performed by an auxiliary processing device to determine a step size using a step cache according to various embodiments.

In one or more embodiments, an auxiliary processing device (e.g., the auxiliary processing device 120 of FIG. 1 and the auxiliary processing device 220 of FIG. 2) may include a processing unit (e.g., the processing unit 121 of FIG. 1), a memory management unit (e.g., the memory management unit 122 of FIG. 1), and a device memory (e.g., the device memory 123 of FIG. 1).

The memory management unit may further include a step cache that may store cached STEs among a plurality of candidate STEs.

In one or more embodiments, a virtual address 610 may include a VPN tag 611, a PTE offset 612, and a page offset 613. The VPN tag 611 may include a step table tag 614 and a step offset 615. The step table tag 614 may include a step cache tag 616 and a step cache index 617. A number of bits of the step cache index 617 may be determined or selected based on the number of STEs included in a step cache 630. For example, in a case where the step cache 630 includes 32 STEs, the step cache index 617 may have 5 bits.

The memory management unit may determine or select one cached STE 631 from among cached STEs, based on the step cache index 617 of the step table tag 614. By comparing a tag of the determined cached STE 631 to the step cache tag 616, the memory management unit may verify whether the selected cached STE 631 is an STE 631 of the virtual address 610.

For example, based on the tag of the selected cached STE 631 being the same as the step cache tag 616 of the step table tag 614, the memory management unit may determine the selected cached STE 631 as the STE 631. Also, based on the tag of the selected cached STE 631 being the same as the step cache tag 616, the memory management unit may select the STE 631 without accessing the step table of the device memory.

For example, based on the tag of the selected cached STE 631 selected different from the step cache tag 616, the memory management unit may restrict or prevent the determined cached STE 631 from being selected as the STE 631. For example, based on the tag of the selected cached STE 631 being different from the step cache tag 616 (e.g., fail in the verification), the memory management unit may not determine or select the selected cached STE 631 as the STE 631. The memory management unit may acquire, from the device memory, the STE 631 among a plurality of candidate STEs included in the step table. The memory management unit may replace the selected cached STE 631 stored in the step cache with the acquired STE 631. For example, the memory management unit may cache the acquired STE 631 into a memory region of the cached STE 631 determined based on the step cache index 617.

Figure 7:
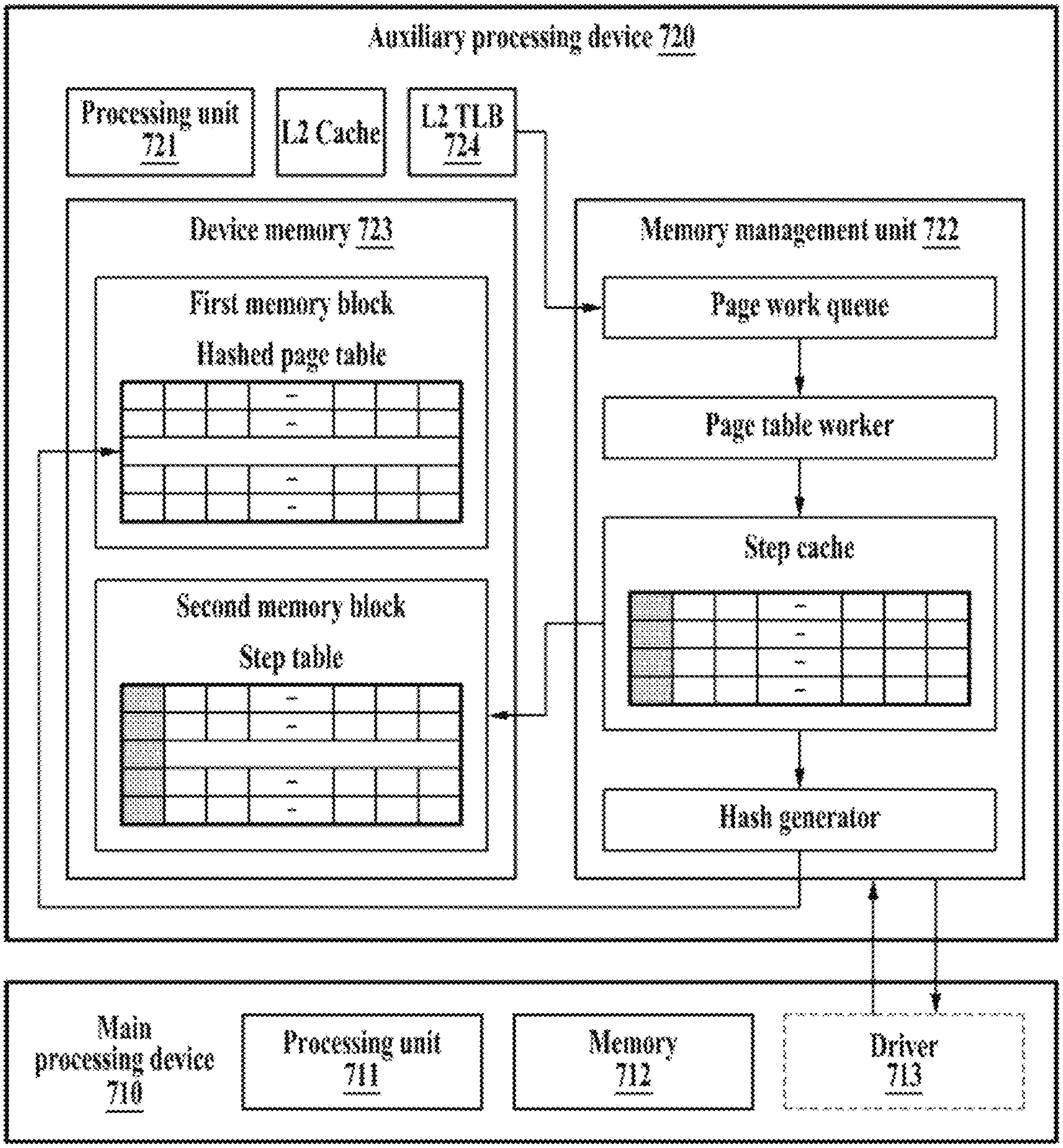
FIG. 7 is a diagram illustrating an example operation performed by an auxiliary processing device to process a memory access request according to various embodiments.

FIG. 7 is a diagram illustrating an example operation performed by an auxiliary processing device to process a memory access request according to various embodiments.

In one or more embodiments, a heterogeneous computing system (e.g., the heterogeneous computing system 100 of FIG. 1) may include a main processing device 710 (e.g., the main processing device 110 of FIG. 1 and the main processing device 210 of FIG. 2) and an auxiliary processing device 720 (e.g., the auxiliary processing device 120 of FIG. 1 and the auxiliary processing device 220 of FIG. 2).

In one or more embodiments, the main processing device 710 may include a processing unit 711 (e.g., the processing unit 111 of FIG. 1), a memory 712 (e.g., the memory 112 of FIG. 1), and a driver 713 (e.g., the driver 113 of FIG. 1).

In one or more embodiments, the auxiliary processing device 720 may include a processing unit 721 (e.g., the processing unit 121 of FIG. 1), a memory management unit 722 (e.g., the memory management unit 122 of FIG. 1), and a device memory 723 (e.g., the device memory 123 of FIG. 1).

The main processing device 710 may store a hashed page table in a first memory block of the device memory 723 using the driver 713. The main processing device 710 may store a step table in a second memory block of the device memory 723. Based on the hashed page table, the main processing device 710 may store, in the device memory 723, pages of an application to be executed by the auxiliary processing device 720.

In one or more embodiments, the auxiliary processing device 720 may further include a level-2 translation lookaside buffer (L2 TLB) 724. In response to a memory access request for a virtual address, the processing unit 721 may verify whether the L2 TLB 724 stores a physical address corresponding to the virtual address. When the L2 TLB 724 stores the physical address corresponding to the virtual address, the processing unit 721 may access the device memory 723 using the physical address stored in the L2 TLB 724. When the L2 TLB 724 does not store the physical address corresponding to the virtual address, the processing unit 721 may transmit the memory access request to the memory management unit 722.

The memory management unit 722 may determine the physical address corresponding to the virtual address. In one or more embodiments, the memory management unit 722 may include a page work queue, a page table worker, a step cache, and a hash generator.

The page work queue may refer to a queue that manages memory access requests and queues operations used in the process of translating virtual addresses into physical addresses in an orderly fashion. The page work queue may efficiently handle a large number of memory requests. The page work queue may support sequential page table lookups while maintaining the order of memory access requests.

When selecting an address translation operation from the page work queue, the page table worker may verify whether an STE corresponding to a virtual address is included in the step cache. As described above with reference to FIG. 6, the page table worker may determine, based on a step cache tag and a step cache index of the virtual address, whether the STE corresponding to the virtual address is present in the step cache. Based on the STE corresponding to the virtual address being present in the step cache, the page table worker may determine a step size.

Based on the STE corresponding to the virtual address being not present in (e.g., absent from) the step cache, the page table worker may determine or select the STE corresponding to the virtual address in a step table of the second memory block of the device memory 723 and determine the step size. The page table worker may cache the determined or selected STE in the step cache. The page table worker may acquire, based on the virtual address and the determined step size, the physical address by accessing a hashed page table. The operation of acquiring the physical address may be performed in the same or similar manner as the one described above with reference to FIGS. 2 through 6.

The hash generator may determine a hash value of the VPN tag and/or a hash value of the step table tag.

In one or more embodiments, the device memory 723 may further include a victim buffer. When the step size is not determined based on the step cache and/or the step table, the page table worker may determine whether the step size is present in the victim buffer. When the step size corresponding to the virtual address (or the VPN tag) is present in the victim buffer, the page table worker may determine the step size and access the hashed page table using the determined step size.

When the step size is not determined from the step cache, the step table, and/or the victim buffer, the page table worker may determine that a page fault has occurred. The page fault may indicate that there is no physical address of the device memory 723 mapped to the virtual address. The auxiliary processing device 720 may transmit information about the page fault (e.g., an interrupt signal) to the main processing device 710. Based on receiving the information about the page fault, the main processing device 710 may allocate a PTE corresponding to the virtual address of the page and update the hashed page table and the step table, using the driver 713. The operations performed by the main processing device 710 to allocate the PTE corresponding to the virtual address of the page and update the hashed page table and the step table may be performed in the same or similar manner as described above with reference to FIGS. 2 through 4.

Figure 8:
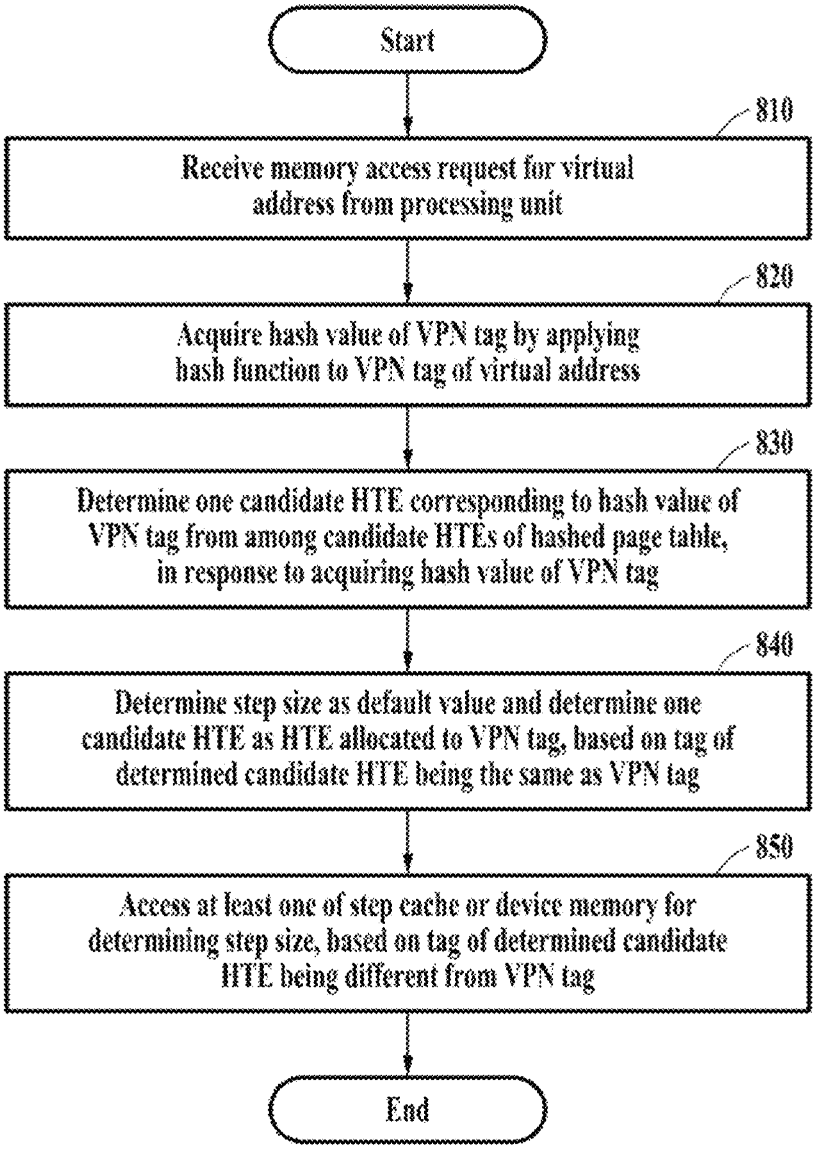
FIG. 8 is a flowchart illustrating an example process performed by an auxiliary processing device to translate a virtual address into a physical address according to various embodiments.

FIG. 8 is a flowchart illustrating an example method performed by an auxiliary processing device to translate a virtual address into a physical address according to various embodiments.

In one or more embodiments, an auxiliary processing device (e.g., the auxiliary processing device 120 of FIG. 1, the auxiliary processing device 220 of FIG. 2, and the auxiliary processing device 720 of FIG. 7) may include a processing unit (e.g., the processing unit 121 of FIG. 1 and the processing unit 721 of FIG. 7), a memory management unit (e.g., the memory management unit 122 of FIG. 1 and the memory management unit 722 of FIG. 7), and a device memory (e.g., the device memory 123 of FIG. 1 and the device memory 723 of FIG. 7).

At operation 810, the memory management unit may acquire a memory access request for a virtual address from the processing unit. The operation of acquiring the memory access request may be performed in the same or similar manner as the one described above with reference to FIGS. 1 through 7.

At operation 820, the memory management unit may acquire a hash value of a VPN tag of the virtual address as a result of applying a hash function to the VPN tag of the virtual address. The operation of acquiring the hash value of the VPN tag may be performed in the same or similar manner as described above with reference to FIGS. 1 through 7.

At operation 830, in response to or based on acquiring the hash value of the VPN tag, the memory management unit may determine or select a temporary HTE corresponding to the hash value of the VPN tag from among a plurality of candidate HTEs in the hashed page table. Each HTE in the hashed page table may include a tag of a corresponding HTE.

At operation 840, based on the tag of the temporary HTE being the same as the VPN tag, the memory management unit may determine a step size as a default value (e.g., 0) and select the temporary HTE as an HTE allocated to the VPN tag.

At operation 850, based on the tag of the temporary HTE being different from the VPN tag, the memory management unit may access at least one of the step cache or the device memory to determine the step size. The memory management unit may use the step cache or the device memory (e.g., a second memory block) to determine the step size. The memory management unit may acquire a physical address using the determined step size. The operation of acquiring the physical address using the step size may be performed in the same or similar manner as described above with reference to FIGS. 1 through 7.

The example embodiments described herein may be implemented using hardware components, software components and/or combinations thereof. A processing device may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct or configure the processing device to operate as desired. The software and/or data may be embodied permanently or temporarily in any type of machine, component, physical or virtual equipment, computer storage medium or device, or in a propagated signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

Methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter.

The above-described hardware devices may be configured to act as one or more software modules in order to perform the operations of the above-described examples, or vice versa.

The phrases "at least one of A, B, and C," "at least one of A, B, or C," and the like are intended to have disjunctive meanings, and these phrases "at least one of A, B, and C," "at least one of A, B, or C," and the like may also include examples in which there may be one or more of each of A, B, and/or C (e.g., any combination of one or more of each of A, B, and C), unless the corresponding description and embodiment necessitates such listings (e.g., "at least one of A, B, and C") to be interpreted to have a conjunctive meaning.

While some specific examples are described above, it will be apparent after an understanding of the disclosure that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, in addition to the above description, the scope of the disclosure may also be defined by the claims and their equivalents, and all variations within the scope of the claims and their equivalents are to be construed as being included in the disclosure.

What is claimed is:

1. An electronic device, comprising:
a processing unit;
a device memory; and
a memory management unit configured to:
receive, from the processing unit, a memory access request corresponding to a virtual address,
acquire a hash value of a virtual page number (VPN) tag associated with the virtual address by applying a hash function to the VPN tag,
determine a step size for avoiding a hash collision, based on the VPN tag, and
select a hash table entry (HTE) allocated to the VPN tag from among a plurality of candidate HTEs included in a hashed page table, based on the hash value and the step size.

2. The electronic device of claim 1, further comprising:
a page table base register configured to store a physical base address of a memory block in the device memory, wherein the hashed page table is stored in the memory block,
wherein the memory management unit is further configured to:
acquire a physical address by applying the hash value of the VPN tag and the step size to the physical base address of the memory block, and
select an HTE corresponding to the physical address as the HTE allocated to the VPN tag.

3. The electronic device of claim 1, wherein the memory management unit is further configured to:
select a page table entry (PTE) from among a plurality of candidate PTEs included in the selected HTE, based on a PTE offset corresponding to the virtual address, and
acquire a physical base address of a page corresponding to the virtual address stored in the selected PTE.

4. The electronic device of claim 3, wherein the memory management unit is further configured to:
apply a page offset of the virtual address to the physical base address of the page to obtain a result address, and
determine the result address as a physical address corresponding to the virtual address.

5. The electronic device of claim 1, wherein the device memory is configured to store a step table including step sizes for a plurality of candidate pages, and
wherein the memory management unit is further configured to:
determine, based on a step table tag associated with the VPN tag, a step table entry (STE) allocated to the step table tag from among a plurality of candidate STEs included in the step table, and
determine, based on a step offset of the VPN tag, a step size allocated to the VPN tag from among a plurality of candidate step sizes included in the STE.

6. The electronic device of claim 5, further comprising:
a step table base register configured to store a physical base address of a memory block in the device memory, wherein the step table is stored in the memory block,
wherein the memory management unit is further configured to:
acquire a hash value of the step table tag by applying a step hash function to the step table tag,
obtain a value by applying the hash value of the step table tag to the physical base address stored in the step table base register, and
acquire a physical base address of the STE based on the value.

7. The electronic device of claim 5, wherein the memory management unit further comprises:
a step cache configured to store cached STEs among the plurality of candidate STEs,
wherein the memory management unit is further configured to:
select a cached STE from among a plurality of cached STEs, based on a step cache index of the step table tag, and
based on a tag associated with the selected cached STE being the same as a step cache tag associated with the step table tag, determine the selected cached STE as the STE.

8. The electronic device of claim 7, wherein the memory management unit is further configured to:
determine the STE without access to the step table included in the device memory, based on the tag of the selected cached STE being the same as the step cache tag.

9. The electronic device of claim 7, wherein the memory management unit is further configured to:
prevent the selected cached STE from being determined as the STE, based on the tag of the selected cached STE being different from the step cache tag,
acquire, from the device memory, the STE from among the plurality of candidate STEs included in the step table, and
replace the selected cached STE stored in the step cache with the acquired STE.

10. The electronic device of claim 1, wherein the memory management unit is further configured to:
based on acquiring the hash value, select a temporary HTE corresponding to the hash value from among the plurality of candidate HTEs in the hashed page table,
based on a tag of the temporary HTE being same as the VPN tag, determine the step size as a default value and select the temporary HTE as the HTE allocated to the VPN tag, and
based on the tag of the temporary HTE being different from the VPN tag, access at least one from among a step cache and the device memory to determine the step size.

* * * * *